United States Patent [19]

Pinch et al.

[11] Patent Number: 4,810,003
[45] Date of Patent: Mar. 7, 1989

[54] QUICK CONNECT STRUT MOUNT

[75] Inventors: William D. Pinch, Dearborn; Douglas A. Dolengowski, Troy, both of Mich.

[73] Assignee: Saturn Corporation, Troy, Mich.

[21] Appl. No.: 9,954

[22] Filed: Feb. 2, 1987

[51] Int. Cl.$^4$ ................................................. F16F 9/54
[52] U.S. Cl. ............................... 280/668; 188/321.11; 267/33
[58] Field of Search ............... 280/673, 668, 696, 660, 280/662; 267/220, 35, 33; 188/321.11; 403/195, 194, 238, 239; 24/662, 352, 584

[56] References Cited

U.S. PATENT DOCUMENTS

| | | | |
|---|---|---|---|
| 829,359 | 8/1906 | Weidmüller | 24/622 |
| 3,042,393 | 7/1962 | Heiss et al. | 267/35 |
| 4,618,130 | 10/1986 | Veglia | 267/220 |

FOREIGN PATENT DOCUMENTS

| | | | |
|---|---|---|---|
| 2026131 | 1/1980 | United Kingdom | 267/33 |
| 2158549 | 11/1985 | United Kingdom | 267/35 |

Primary Examiner—Charles A. Marmor
Assistant Examiner—Karin L. Ferriter
Attorney, Agent, or Firm—Charles R. White

[57] ABSTRACT

The strut mount is secured to the piston rod of the damper of the strut and provides the upper seat for the suspension spring. A support plate with a coned opening cams a snap ring held in the isolator or rubber body of the mount radially inwardly. At the top of the coned opening, the snap ring deflects radially outwardly over the top of the coned opening to engage the upper surface thereof to lock the isolator and the strut in position.

4 Claims, 1 Drawing Sheet

QUICK CONNECT STRUT MOUNT

FIELD OF THE INVENTION

This invention relates to suspension struts operatively connecting a road wheel to support structure in a vehicle and more particularly to a new and improved strut mount providing for the optimized mechanical and time efficient connection of the strut to the support structure while effectively isolating the strut from the vehicle body. This invention also relates to a new and improved method of coupling of a suspension strut to support structure with a quick connect mount installed using a generally linear directed installation force from a position below the support structure.

BRIEF SUMMARY OF THE INVENTION

The support structure in the mount tower of a vehicle body is formed with a truncated conical opening. The strut mount assembly comprises a resilient body of a rubber material secured by a centralized metallic sleeve to the piston rod of the strut for isolating the strut from the vehicle body. The body of the mount has an upper surface which corresponds to the support structure including a truncated coned portion to fit in the opening in the support structure. This coned portion carries a resilient snap ring retainer that is trapped in a horizontal groove therein. The suspension strut and the mount is moved generally vertically from a position below the vehicle so that the snap ring is progressively squeezed radially inwardly by the decreasing diameter conical wall of the support structure. When the snap ring clears the top of the conical wall, it recovers to its normal diameter, greater than the diameter of the upper end of the conical wall, to quickly and precisely lock the strut in installed position. The mount and strut is vertically trapped and the rubber is preloaded in mated position by the snap ring and by the engagement of an annular flange of the body of the mount with the lower surface of the support structure provided by a mounting plate. Arcuately spaced preloading ribs are provided on the upper surface of the main body of the mount to optimize the preload for mount durability.

DETAILED DESCRIPTION

Figure 1:
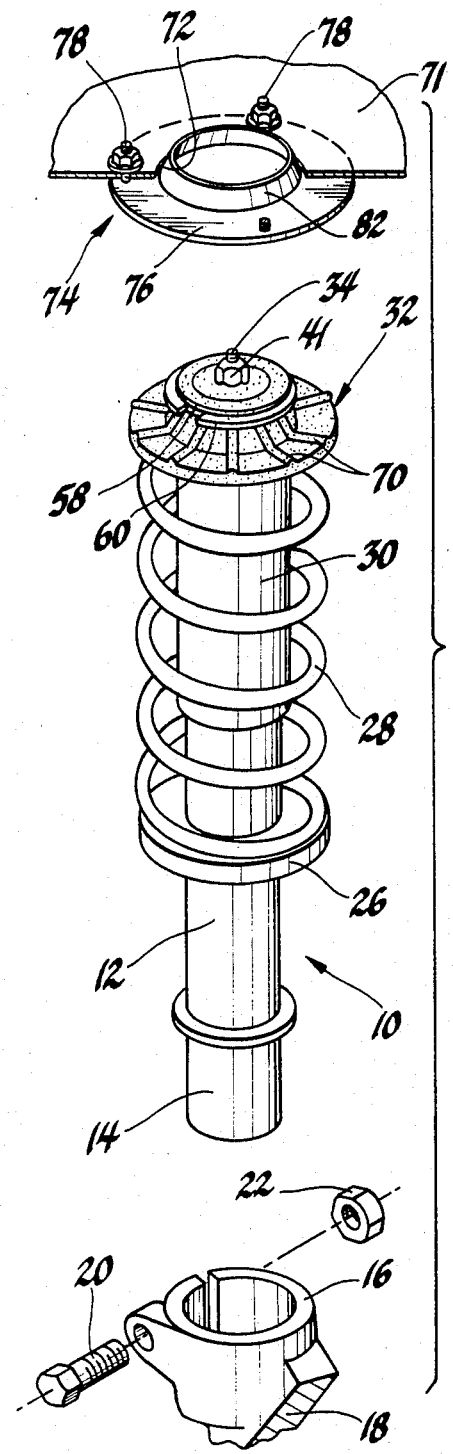
FIG. 1 is an exploded view of a suspension strut, the isolator mount and support structure in the vehicle.

Turning now in greater detail to the drawing, FIG. 1 shows a suspension strut 10 having an outer support tube 12 with a lower end 14 adapted to be received in a mounting cup 16 of a road wheel assembly 18. Conventional bolt and nut means 20, 22 are employed to secure the strut to the mounting cup 16. The strut is a conventional strut that may be of the wet-build or cartridge-type such as disclosed in the U.S. Pat. No. 4,276,971, issued to R. A. Horvath, entitled Vehicle Suspension Strut With Serviceable Shock Absorber Cartridge, assigned to the assignee of this invention and hereby incorporated by reference.

Strut 10, shown in the extended position, has an outer support tube with a lower spring seat 26 secured thereto by any suitable means including bearing means which would allow the rotation of the strut relative to the spring seat in the event that the road wheel is steerable. Seated on the spring seat 26 is a helical suspension spring 28 which is disposed around the upper portion of the strut and a conventional dust tube 30 and which terminates in seating engagement with an annular upper mount assembly 32. This strut can have a jounce bumper of any suitable construction but such is not shown since it forms no part of this invention. The upper mount assembly 32 is attached to the reduced diameter upper end of a piston rod 34 of the damper by top and bottom washers 36 and 38 and by a nut 41 threaded on the end of the piston rod into tight engagement with the top washer 36.

The upper mount ass 32 has at its core a cylindrical metal bushing 40 which has an outer peripheral wall bonded to the inner wall 46 of an annular body 48 of a suitable rubber which, through its resiliency, isolates the strut and the suspension spring from the body of the vehicle. More particularly, the mount is designed to isolate the suspension spring from the vehicle body with a high spring rate by compression loading while the velocity sensitive piston rod is isolated from the vehicle body with a low spring rate since the center portion of the mount is worked in shear by the rod of the damper piston.

Figure 2:
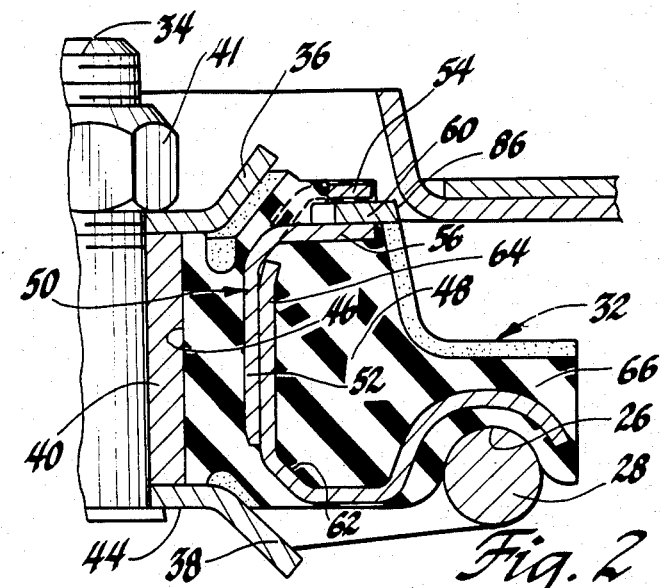
FIG. 2 is a cross-sectional view of a portion of the upper mount and mounting tower illustrating these parts being joined together.
Figure 3:
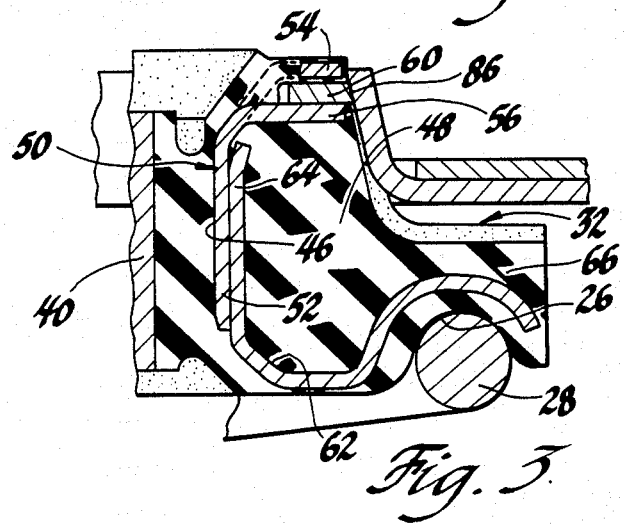
FIG. 3 is a view similar to the FIG. 2 view showing the portion of the mount and mounting tower just prior to locking engagement.
Figure 4:
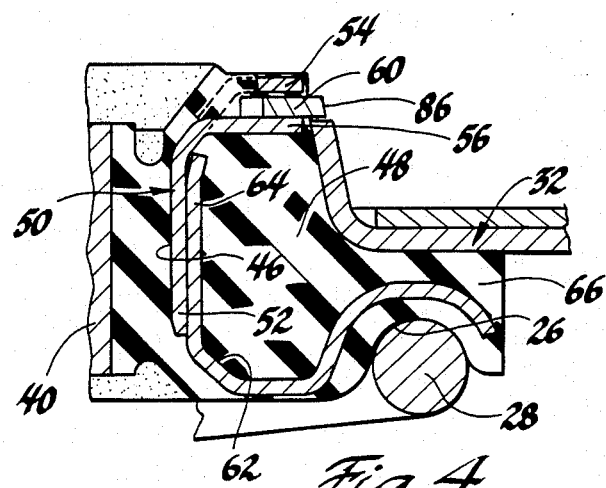
FIG. 4 is a view similar to the views of FIGS. 2 and 3 showing the upper mount locked to the mounting tower of the vehicle.

Molded within the rubber body 48 is a steel snap ring retainer 50 having a main cylindrical wall 52 and having two series of radially extending flange segments 54 and 56 vertically spaced and alternating to form an annular groove 58 to receive and retain a flat metallic snap ring 60 with terminal ends facing one another as illustrated best in FIG. 1. In addition to the snap ring retainer 50, the rubber body of the mount assembly 32 also has an annular metallic suspension spring seat 62 molded therein which has a cylindrical wall 64 that may be fastened to the adjacent wall 52 of the snap ring retainer or may be separate therefrom if desired. The lower end of the spring seat is flanged to extend radially outwardly almost to the extent of the enveloping flange 66 of the rubber body 48 and has an annular concave configuration which accommodates the top coil of the suspension spring as shown by FIGS. 2-4. The rubber body 48 of the mount assembly has a series of arcuately spaced and radially extending preloading ribs 70 formed on the upper surface thereof which when in the installed position to improve loading of the rubber to increase service life of the mount.

This invention provides for the optimized "snap on" connection of the strut to the vehicle body 71. To this end, the mounting tower of the vehicle body is formed with a circular opening 72 therein. An annular reinforcing mounting plate 74 having a circular flange 76 is fastened to the mounting tower by threaded fastener means 78 shown in FIG. 1. The tower could be formed so that the mounting plate could be eliminated, if desired. In any event, the mounting plate has a coned central opening 80 defined by the upwardly extending wall 82 whose diameter decreases with height as illustrated. The interior surface wall 82 provides a camming surface for radially constricting the snap ring 60 whose outer peripheral edge 86 is tapered to facilitate installation as best illustrated in FIGS. 2 and 3.

In FIG. 2, the strut is being raised toward connection with the mounting tower and the snap ring 60 is just below the mounting plate 74. FIG. 3 illustrates the snap ring being constricted by the coned or tapered inner wall of the center portion of the mounting plate. As the strut is raised, the installation force applied by the installer or installation equipment constricts the snap ring so that it is allowed to pass through the central opening. In FIG. 4, the snap ring has been moved to a position over the top of the mounting plate cone so that it springs radially outwardly in recovery to its original shape to quickly connect or lock the strut to the vehicle body. In this position, the top of flange 66 engages the bottom surface of flange 76. The rubber of the mount is preloaded by the ribs 70 so that deflection only involves loaded rubber material to increase durability.

This invention provides dual spring rate with the flange 66 of the mount body being loaded by the suspension spring in compression for high spring rate isolation while the shock absorber works the rubber body in shear for a low spring rate for this velocity sensitive element of the suspension.

This invention further facilitates removal of the strut as a unit from the vehicle body. For removal, the snap ring 60 is constricted from the FIG. 4 position and the strut is moved vertically downwardly into the positions of FIGS. 3 and 2 in that order. The strut can then be inspected, repaired or replaced as required.

While a preferred embodiment of this invention has been shown and described to illustrate the invention, other modifications and spring detente configurations will now become more apparent to those skilled in the art. Accordingly, the scope of this invention is set forth in the following claims.

The embodiments of the invention in which an exclusive property or privilege is claimed are defined as follows:

1. A quick connect strut mount for operatively connecting a suspension strut to support structure in a vehicle including an opening defined by camming wall means inwardly inclined from a lower surface to a terminal upper end, said mount including resilient isolator means of rubber material operatively connected to the upper end of said suspension strut, retainer means supported by said resilient isolator means having vertically spaced upper and lower flange means defining an annular groove, and snap ring means trapped in said annular groove and constrictable by said camming wall means in response to the insertion of said isolator means within said opening from one end thereof and naturally expandable to a predetermined expanded and locking state when reaching a predetermined position above the terminal upper end of said camming means to thereby positively lock said mount and strut in position with respect to said support structure.

2. The mount of claim 1 wherein said camming wall means is formed by conical wall means having an upper surface and wherein said isolator means has an outwardly extending flange means with radially extending and resilient rib means which engage the lower surface of said support structure as said snap-ring means engages said terminal upper end of said conical wall means to lock said mount and said strut to said support structure.

3. The mount of claim 2 wherein said rib means are arcuately spaced and are simultaneously engaged by said lower surface of said support structure to preload said rubber material of said isolator.

4. The mount means of claim 2 wherein said ribs means are formed on the upper surface of said isolator means for engagement with said inner wall of said conical wall means as well as and said lower surface of said support structure for preloading said elastomer means when in said predetermined position.

* * * * *

UNITED STATES PATENT AND TRADEMARK OFFICE
CERTIFICATE OF CORRECTION

PATENT NO. : 4,810,003

DATED : March 7, 1989

INVENTOR(S) : William D. Pinch, et al

Page 1 of 3

It is certified that error appears in the above-identified patent and that said Letters Patent is hereby corrected as shown below:

The sheet of Drawing consisting of Figures 1 - 4 should be deleted to appear as per attached sheet.

The title page should be deleted to appear as per attached title page.

Signed and Sealed this

Thirty-first Day of October, 1989

Attest:

DONALD J. QUIGG

*Attesting Officer*   *Commissioner of Patents and Trademarks*

United States Patent [19]
Pinch et al.

[11] Patent Number: 4,810,003
[45] Date of Patent: Mar. 7, 1989

[54] QUICK CONNECT STRUT MOUNT

[75] Inventors: William D. Pinch, Dearborn; Douglas A. Dolengowski, Troy, both of Mich.

[73] Assignee: Saturn Corporation, Troy, Mich.

[21] Appl. No.: 9,954

[22] Filed: Feb. 2, 1987

[51] Int. Cl.⁴ .................................................. F16F 9/54
[52] U.S. Cl. .................................. 280/668; 188/321.11; 267/33
[58] Field of Search ............ 280/673, 668, 696, 660, 280/662; 267/220, 35, 33; 188/321.11; 403/195, 194, 238, 239; 24/662, 352, 584

[56] References Cited

U.S. PATENT DOCUMENTS

| 829,359 | 8/1906 | Weidmüller | 24/622 |
| 3,042,393 | 7/1962 | Heiss et al. | 267/35 |
| 4,618,130 | 10/1986 | Veglia | 267/220 |

FOREIGN PATENT DOCUMENTS

| 2026131 | 1/1980 | United Kingdom | 267/33 |
| 2158549 | 11/1985 | United Kingdom | 267/35 |

*Primary Examiner*—Charles A. Marmor
*Assistant Examiner*—Karin L. Ferriter
*Attorney, Agent, or Firm*—Charles R. White

[57] ABSTRACT

The strut mount is secured to the piston rod of the damper of the strut and provides the upper seat for the suspension spring. A support plate with a coned opening cams a snap ring held in the isolator or rubber body of the mount radially inwardly. At the top of the coned opening, the snap ring deflects radially outwardly over the top of the coned opening to engage the upper surface thereof to lock the isolator and the strut in position.

4 Claims, 1 Drawing Sheet

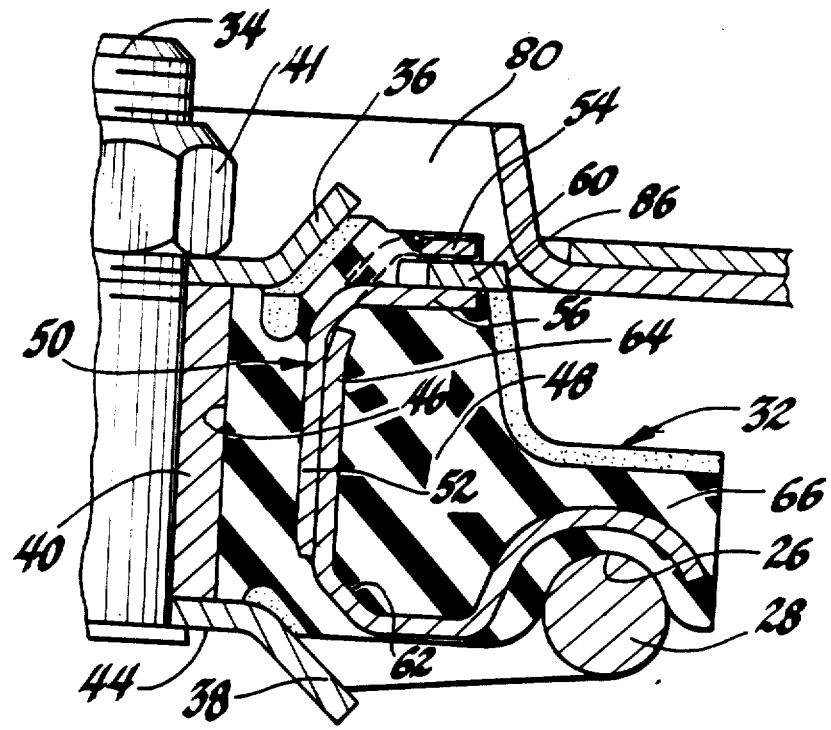

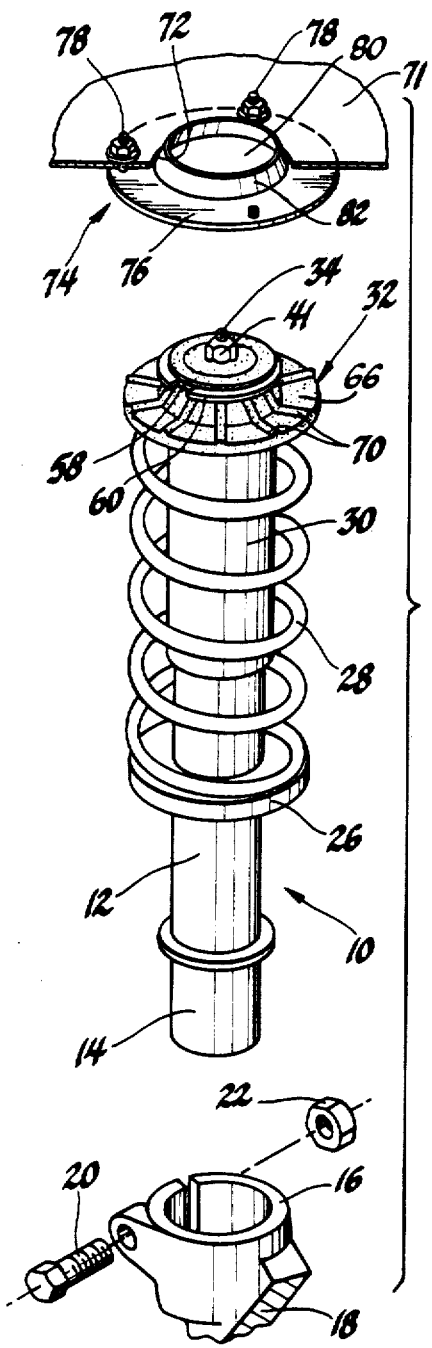
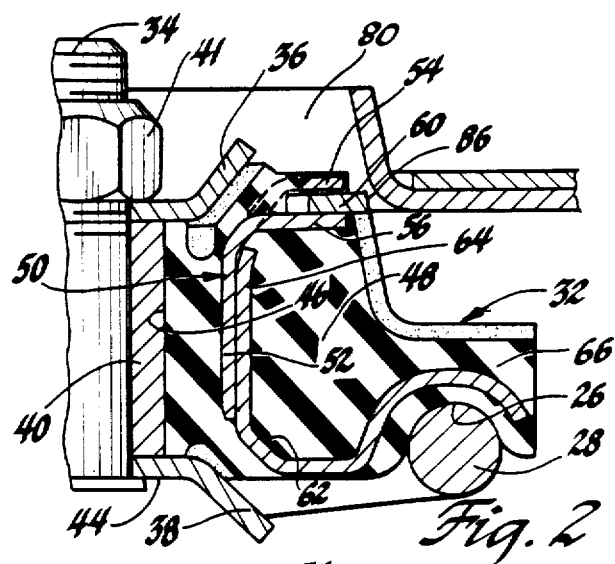
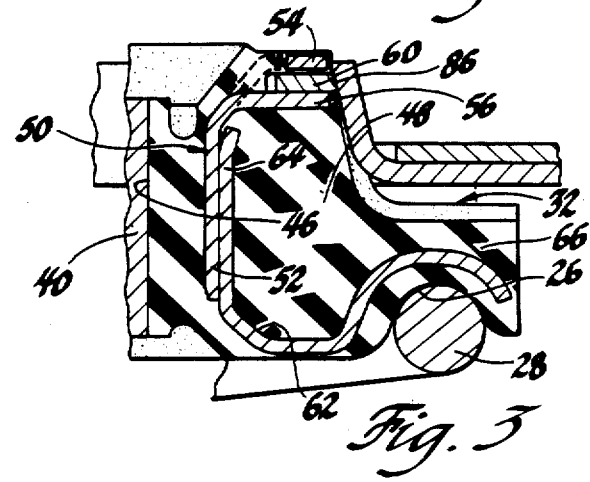
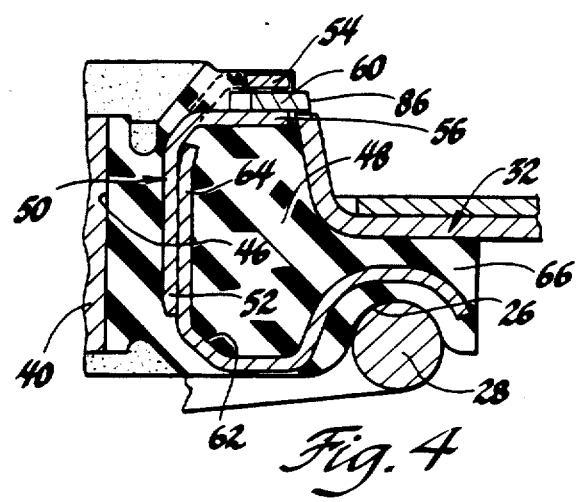
Fig. 1
Fig. 2
Fig. 3
Fig. 4